United States Patent [19]

Kondo et al.

[11] Patent Number: 5,359,604
[45] Date of Patent: Oct. 25, 1994

[54] INPUT-OUTPUT SIGNAL CONTROL APPARATUS

[75] Inventors: Ryuichi Kondo; Haruo Yamashita; Tomohiro Shinomiya, all of Kawasaki, Japan

[73] Assignees: Fujitsu Limited; Nippon Telegraph and Telephone Corporation, Tokyo, Japan

[21] Appl. No.: 902,596

[22] Filed: Jun. 22, 1992

[30] Foreign Application Priority Data

Jun. 21, 1991 [JP] Japan ............................. 3-149089

[51] Int. Cl.⁵ .................................................. H04J 3/06
[52] U.S. Cl. ................................... 370/100.1; 370/112
[58] Field of Search ............... 370/112, 94.1, 60, 89, 370/58.1, 112, 100.1; 307/243, 244; 328/153, 154

[56] References Cited

U.S. PATENT DOCUMENTS

| | | | |
|---|---|---|---|
| 3,755,786 | 3/1973 | Dixon et al. | 340/172.5 |
| 4,389,721 | 6/1983 | Young et al. | 370/88 |
| 4,817,082 | 3/1989 | Orsic | 370/85.5 |
| 4,821,258 | 4/1989 | Fraser | 370/60 |
| 4,837,763 | 6/1989 | Sasaki | 370/112 |
| 4,967,410 | 10/1990 | Takase et al. | 370/112 |
| 4,970,719 | 11/1990 | Takase et al. | 370/112 |

FOREIGN PATENT DOCUMENTS 2-4070   1/1990   Japan.

OTHER PUBLICATIONS

Patent Abstracts of Japan, vol. 6, No. 32 (E-96)(910), Feb. 26, 1992 & JP-A-56 152 352 (Hitashi Seisakusho K.K.), Nov. 25, 1981, *abstract*.

Primary Examiner—Douglas W. Olms
Assistant Examiner—Ajit Patel
Attorney, Agent, or Firm—Staas & Halsey

[57] ABSTRACT

When input signals from a plurality of input ports are selected and are inserted into the time slots to be output from a single output port and to insert respective signal data into time slots in synchronization with a synchronizing signal, the apparatus is so constructed that selector units (5-i) are provided to correspond to input ports (1-i), and a synchronizing signal generating unit (4) is provided to output, synchronously, a synchronizing signal and selecting signal information for designating a selector unit (5-i); the selector unit (5-i) being provided with a determining unit (6) for determining whether or not the selecting signal information designates the selector.

9 Claims, 9 Drawing Sheets

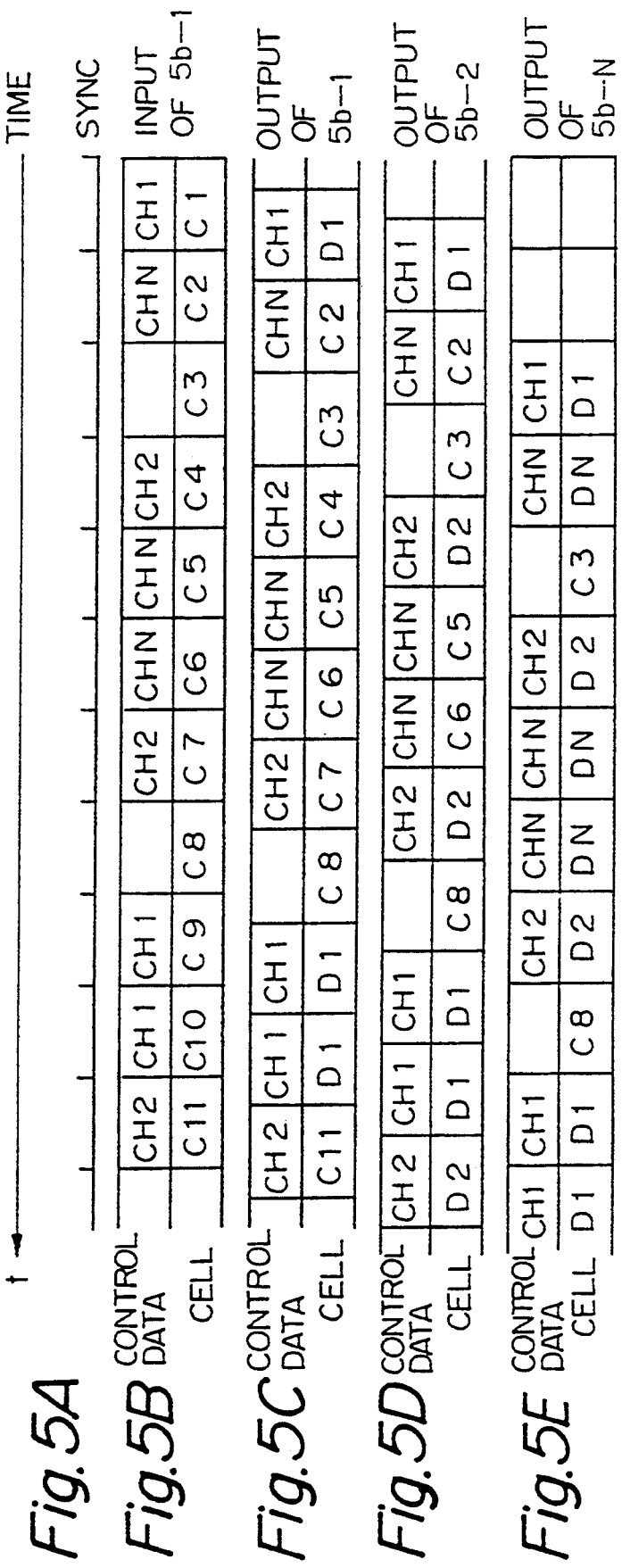

Fig.6A — INPUT OF 5b-1

| CH | Data |
|---|---|
| CH1 | C1 |
| CHN | C2 |
| CHN | C3 |
| CH2 | C4 |
| CHN | C5 |
| CHN | C6 |
| CH2 | C7 |
| CH1 | C8 |
| CH1 | C9 |
| CH1 | C10 |
| CH2 | C11 |

Fig.6B — OUTPUT OF 5b-1

| CH | Data |
|---|---|
| CH1 | D1 |
| CHN | D1 |
| CHN | C2 |
| CH2 | C3 |
| CHN | C4 |
| CHN | C5 |
| CH2 | C6 |
| CH1 | C7 |
| CH1 | C8 |
| CH1 | D1 |
| CH2 | D1 |

Fig.6C — OUTPUT OF 5b-2

| CH | Data |
|---|---|
| CH1 | D1 |
| CHN | D1 |
| CHN | C2 |
| CH2 | C3 |
| CHN | D2 |
| CHN | C5 |
| CH2 | C6 |
| CH1 | D2 |
| CH1 | C8 |
| CH1 | D1 |
| CH2 | D1 |

Fig.6D — OUTPUT OF 5b-N

| CH | Data |
|---|---|
| CH1 | D1 |
| CHN | D1 |
| CHN | D2 |
| CH2 | C3 |
| CHN | DN |
| CHN | D2 |
| CH2 | D2 |
| CH1 | DN |
| CH1 | D2 |
| CH1 | D1 |
| CH2 | D1 |

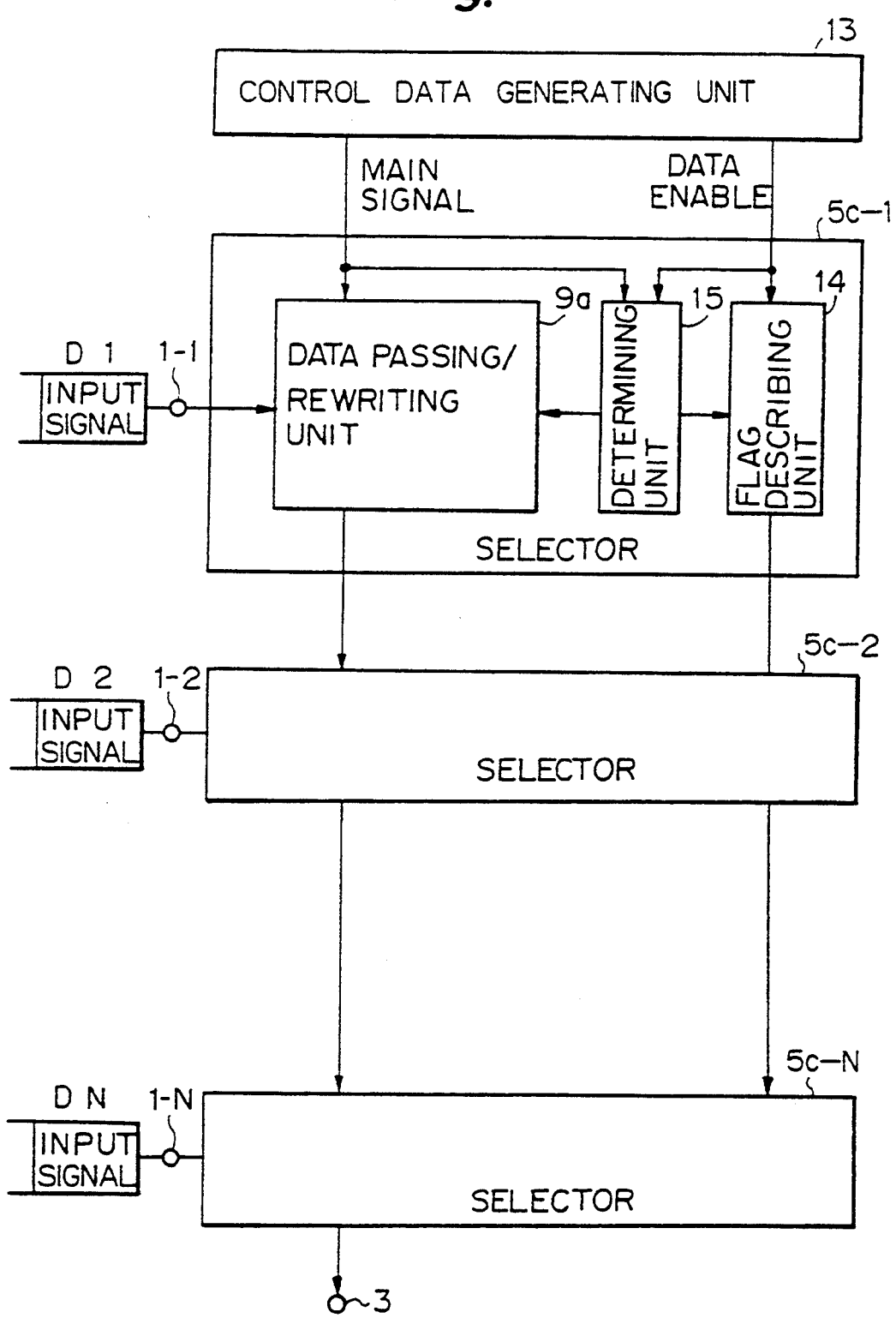

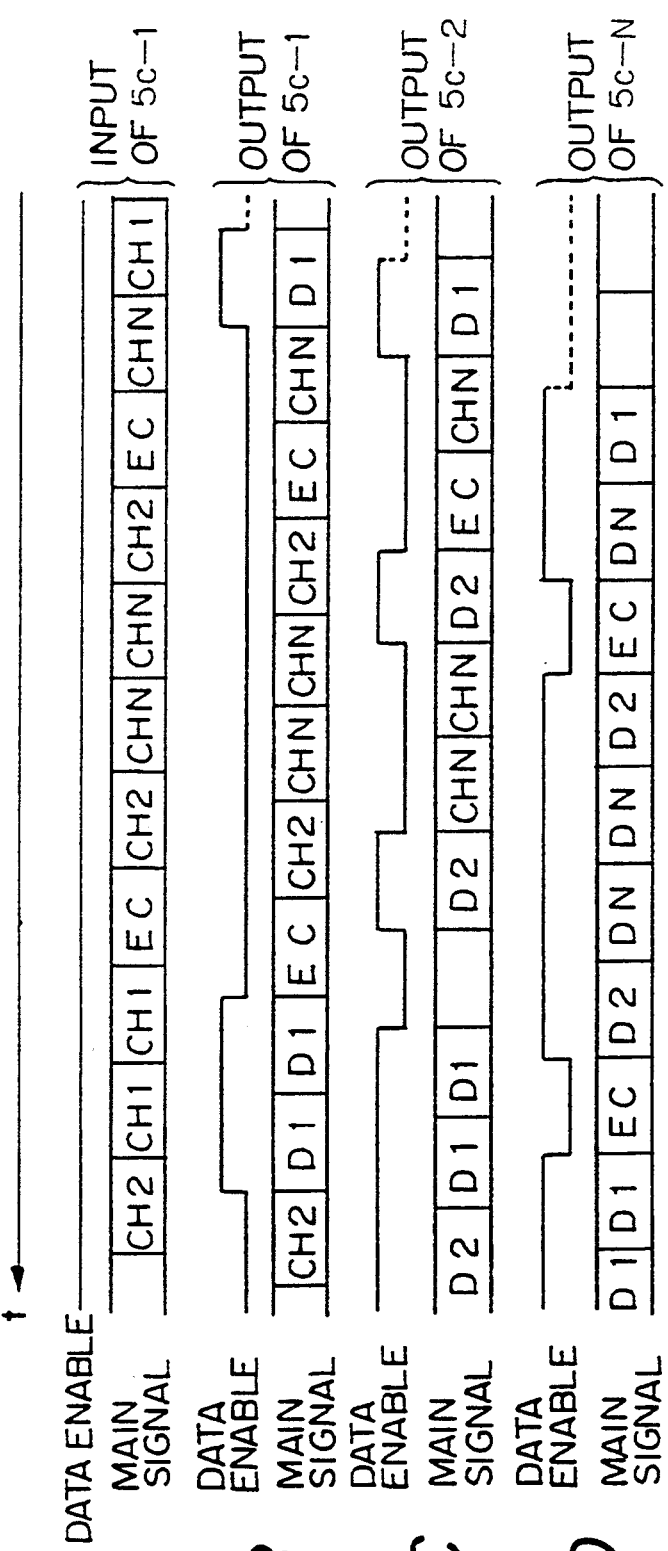

INPUT-OUTPUT SIGNAL CONTROL APPARATUS

BACKGROUND OF THE INVENTION

1. Field of the Invention

The present invention relates to an input-output signal control apparatus, and more particularly, in ATM communication or a high speed packet communication in a broad-band ISDN, to an input-output signal control apparatus for inserting data from a plurality of input ports into designated time slots and for outputting them as a main signal from a single output port.

2. Description of the Related Art

A conventional control apparatus for selecting an output signal of an ATM apparatus and so forth has a construction in which a selector unit receives various input signals from input ports, and in response to a selecting signal applied to the selector unit, a connection and a switching are carried out so that the selected signal is output as a main signal from an output port 3.

When input signals are inserted into time slots, it is necessary to true up the phases of all input signals at the input ports, however, in the conventional output signal control apparatus in which the connection and switching in the selector unit are carried out by the selecting signal to select the signal data in a predetermined order from the N data to be inserted into a time slot and to be output to the output port, there is a tendency to shift the phases when the input signals are inserted into the time slots, and it is difficult to true up the phases when the signals to be handled are at high speed. Therefore, there is a disadvantage in that the input signals to be inserted cannot be stored completely in the time slots.

SUMMARY OF THE INVENTION

The present invention has an object to resolve the above disadvantage, and has an object to provide an input-output signal control apparatus in which, the selection of various signals from input ports and the insertion of the signals into time slots are effected synchronous with a synchronizing signal so that the input signals are output in the form of trued up phases.

To attain the above object, there is provided, according to the present invention, an input-output signal control apparatus for receiving input signals through a plurality of input ports, respectively, and for converting the received input signals into a main signal synchronized with a sequence of time slots. The main signal is output through a main signal line from a single output port. The apparatus comprises a control data generating unit for generating control data for designating input signals to be output in synchronization with the sequence of time slots, and a plurality of selector units connected to the plurality of input ports, respectively, and connected in series between the control data generating unit and the output port, for selecting, in accordance with the control data, input signals to be output through the main signal line in synchronization with the time slots so as to obtain the main signal at the output port.

It is preferable that each of the selector units detects each of the time slots by a signal in the control data in each of the time slots.

Alternatively, it is preferable that the control signal generating unit further generates a synchronizing signal synchronized with the control data, and that each of the selector units detects each of the time slots by receiving the synchronizing signal.

It is preferable that the control data include, in each of the time slots, a selecting signal for designating one of the selector units, and each of the selector units comprises a determining unit for determining, at every time that the selecting signal is received, whether or not the selector unit, including the determining unit, is designated by the selecting signal, wherein, when the determining unit determines that the selector unit is designated by the selecting signal, the input signal from the corresponding input port is output to the main signal line in synchronization with the time slot of the selecting signal, and when the determining unit determines that the selector unit is not designated by the selecting signal, the data on the main signal line in the time slot of the selecting signal is passed through the selector unit in question without change.

In the above apparatus, it is preferable that the control signal generating unit further generates cells in synchronization with the time slots. Each of the selector units (5-$i$) further comprises a data passing/rewriting unit operatively connected to the determining unit for writing the selected input signal into the cell of the input time slot when the determining unit determines that the selector unit is designated by the selecting signal, and for passing the cell of the input time slot without change when the determining unit determines that the selector unit is not designated by said selecting signal.

In the above apparatus, it is preferable that the selected input signals are written into the cells of the receiving time slots.

Alternatively, it is also preferable that the selected input signals are written into the cells of the next time slots of the receiving time slots.

It is preferable that the cells generated by the control data generating unit are empty cells.

It is still preferable that at least one of the cells generated by the control data generating unit include valid data, and the control data are so formed that the valid data are not rewritten by the input signal.

According to another aspect of the present invention, it is still further preferable that the control data generated from the control data generating unit include a data enable control signal and a sequence of cells; the data enable control signal having a flag in a time slot when an input signal has already been written in the cell of the time slot, and each of the cells possibly including, in each of the time slots, a selecting signal for designating one of the selector units, wherein when the selector signal designates the selector unit in question and when a flag is not established in the time slot of the data enable control signal, the selector unit in question writes an input signal into the cell of the input time slot and establishes a flag in the data enable control signal of the input time slot, and when the selector signal does not designate the selector unit in question or when the flag is established in the time slot of the data enable control signal, the corresponding cell is passed through the selector unit in question.

In the above apparatus, it is preferable that each of the selector units comprises a determining unit for determining, at every time when the selecting signal is received, whether or not the selector unit, including the determining unit, is designated by the selecting signal and the data enable control signal, and for generating a flag establishing signal when the own selector unit is determined to be designated, a data passing/rewriting unit, operatively connected to the determining unit, for writing the selected input signal into the cell of the input time slot when the determining unit determines that the selector unit is designated by the selecting signal, and for passing the cell of the input time slot without change when the determining unit determines that the own selector unit is not designated by the selecting signal, a flag describing unit, operatively connected to the determining unit and the control data generating unit, for establishing a flag in the data enable control signal in synchronization with a time slot, when the input signal is written in a cell of the time slot in response to the flag establishing signal, whereby when a flag is established in a time slot of the data enable control signal, the corresponding cell is not rewritten by an input signal even when a selecting signal for designating the selector unit in question is included in the cell.

BRIEF DESCRIPTION OF THE DRAWINGS

The above features and advantages of the present invention will be more apparent from the following description of the preferred embodiments with reference to the accompanying drawings, wherein:

FIGS. 5A to 5E are time charts of, respectively, a synchronizing signal and four sets of control data and cells explaining an example of the operation of the apparatus shown in FIG. 3;

FIGS. 6A to 6D are time charts of control data and cells explaining another example of the operation of the apparatus shown in FIG. 3;

FIG. 7 is a block diagram showing a construction of an input-output signal control apparatus according to still another embodiment of the present invention;

FIGS. 8A to 8D are time charts of a data enable signal and a main signal explaining the operation of the apparatus shown in FIG. 7.

DESCRIPTION OF THE PREFERRED EMBODIMENTS

Figure 9:
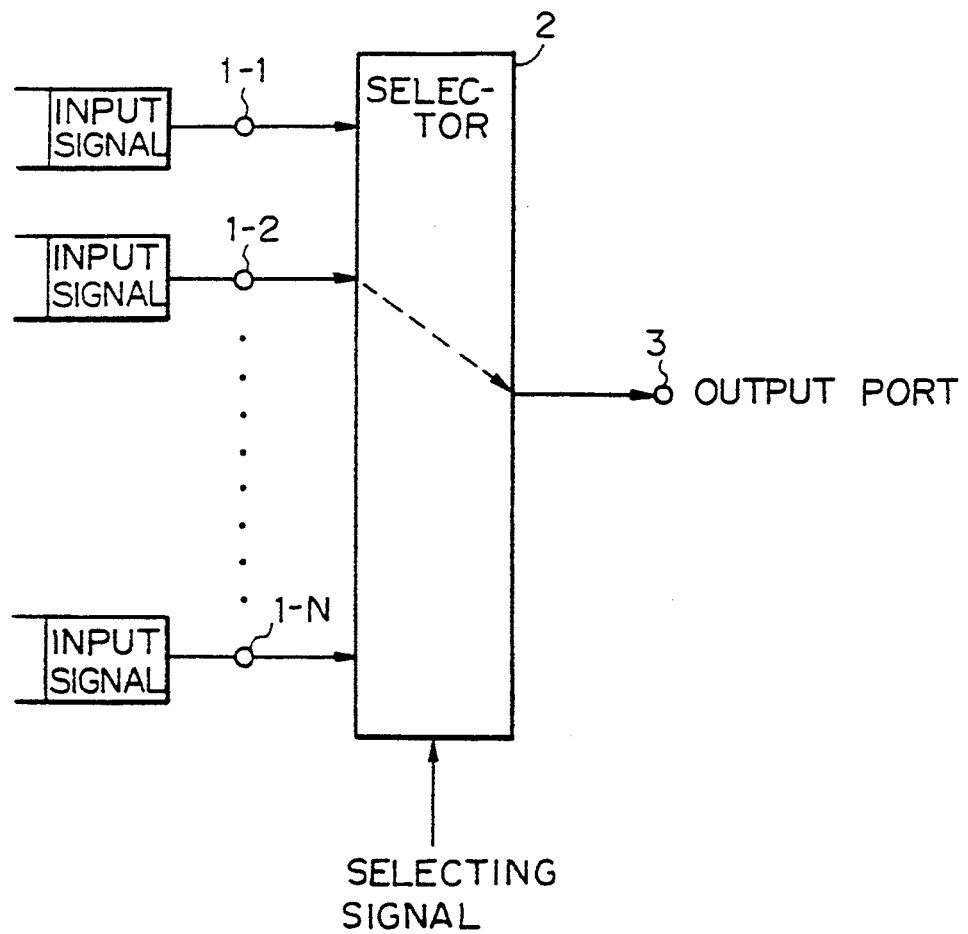
FIG. 9 is a block diagram showing an example of a conventional input-output signal control apparatus.

For a better understanding of the problem to be solved by the present invention, a conventional input-output control apparatus is first described with reference to FIG. 9, in which a selector unit 2 receives various input signals from input ports 1-1 to 1-N, and in response to a selecting signal that is input to the selector unit 2, a connection and a switching are carried out so that the selected signal is output as a main signal from a single output port 3.

As mentioned before, there is a disadvantage in the conventional apparatus in that the input signals to be inserted into the time slots of the output signal cannot be stored completely in the time slots because the input signals do not always have phases that are trued up.

Embodiments of the present invention will now be described. Throughout the description, the same reference symbols represent the same parts.

Figure 1:
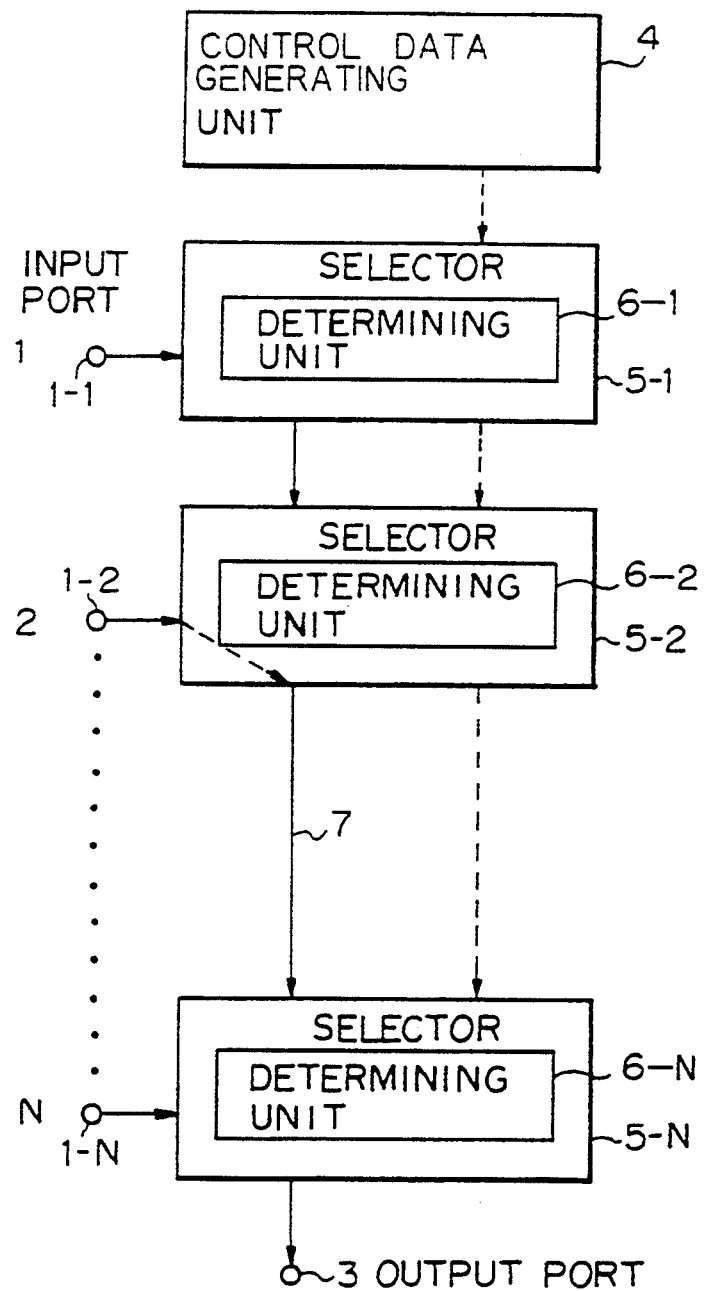
FIG. 1 is a block diagram showing a principal construction of an input-output signal control apparatus according to the present invention.

FIG. 1 is a principal constructional diagram of an input-output signal control apparatus according to the present invention.

In the figure, 1-1 to 1-N represent input ports to which input signals are applied, and 3 is a single output port for outputting a main signal in which selected input signals are inserted. The main signal is in synchronization with a sequence of time slots. Reference numeral 4 is a control data generating unit for synchronously outputting control data for designating the input signals to be output in synchronization with the sequence of time slots. References 5-1 to 5-N are selector units connected to the input ports 1-1 to 1-N, respectively, and connected in series between the control data generating unit 4 and the output port, for selecting, in accordance with the control data, input signals to be output through a main signal line 7 in synchronization with the time slots so as to obtain the main signal at the output port 3.

In the operation, when the selector unit 1-1 is designated by the above-mentioned control data, the input signal from the corresponding input port 1-1 is output in synchronization with the time slot of the control data from the control data generating unit 4. When the selector unit 1-1 is not designated, the time slot is output from the selector unit 1-1 as an empty signal. Similarly, when the selector unit 1-2 is designated by the above-mentioned control data, the input signal from the corresponding input port 1-2 is output in synchronization with the time slot of the control data from the control data generating unit 4. When the selector unit 1-2 is not designated, the data stored in the time slot from the previous stage selector unit 5-1 is passed to the next stage selector unit 5-3 through the main signal line 7 without change. In a similar way, the input signals are inserted into time slots or are not inserted into time slots depending on the control data. Thus, the main signal can be obtained at the output port 3.

References 6-1 to 6-N are determining units each for decoding the control data from the control data generating unit 4 to determine whether or not the selector unit 5-$i$ in question, i.e., the selector unit including the determining unit 6-$i$, is designated.

In each selector unit 5-$i$, when the selector unit 5-$i$ is designated, the data from the corresponding input port 1-$i$ is selected to be output to a time slot in synchronization with the sequence of time slots.

Therefore, by storing the input signals into the time slots, there is no shift of phases in the input signals stored in the time slots, and even when the signals to be handled are high speed, all of the input signals inserted into the time slots are output from the output port 3 in a trued up state.

Figure 2:
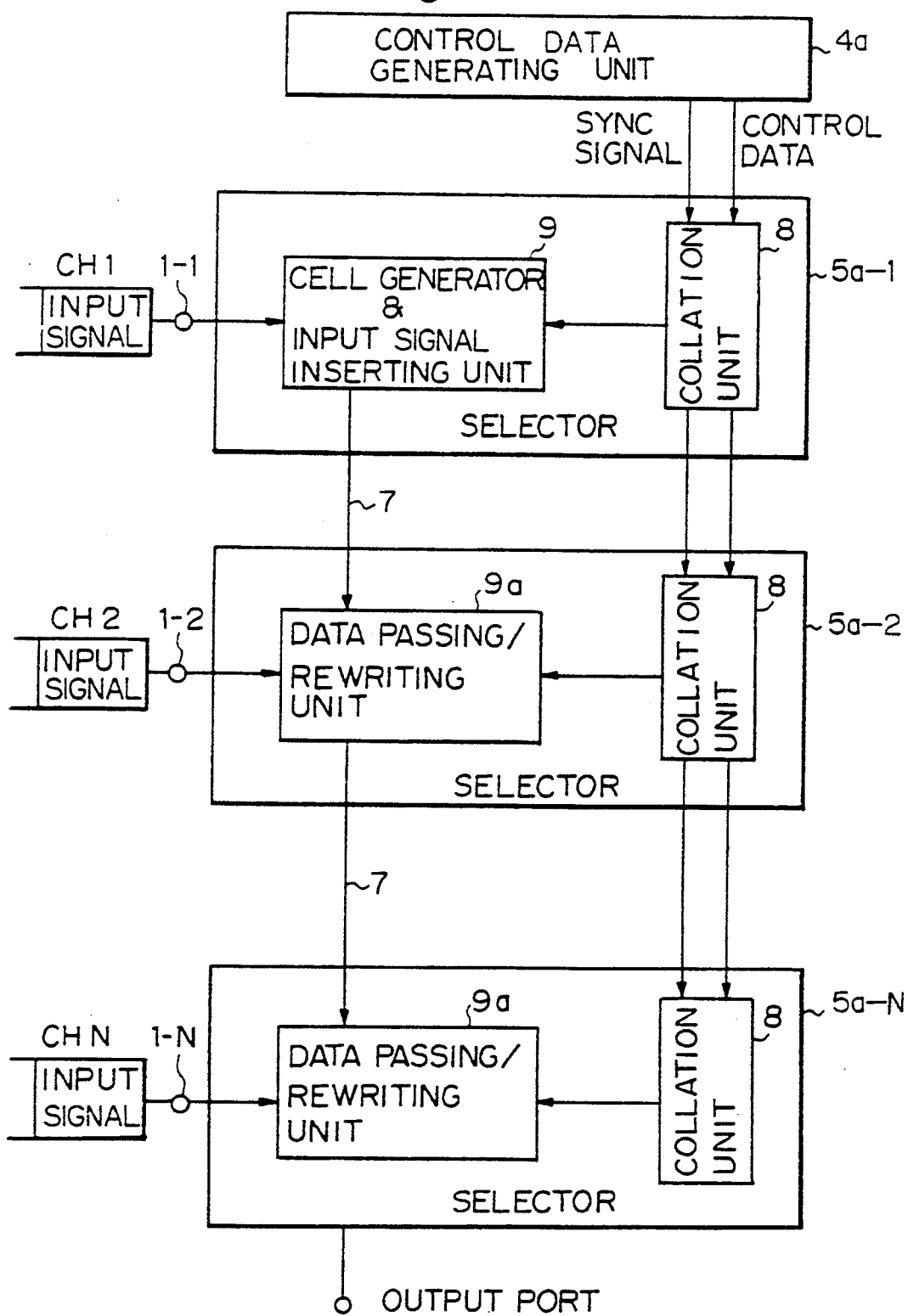
FIG. 2 is a block diagram showing a construction of an input-output signal control apparatus according to an embodiment of the present invention.

FIG. 2 is a block diagram of an input-output signal control apparatus according to an embodiment of the present invention.

Reference symbol 4$a$ is a control data generating unit which, in this embodiment, generates a synchronizing signal SYNC and control data that is in synchronization with the synchronizing signal. A first selector unit 5$a$-1 includes a collation unit 8 and a cell generator and input signal inserting unit 9. The synchronizing signal SYNC is shown in FIG. 5A, and an example of the control data generated from the control data generating unit 4$a$ and the cells generated by the unit 9 are shown in FIG. 5B. Each of the selector units 5$a$-2 to 5$a$-N includes a collation unit 8 and a data passing/rewriting unit 9a. The control data includes names of channels CH1, CH2, CH3, ... in desired time slots, respectively as shown in the upper sides in FIGS. 5B, 5C, 5D, and 5E. These time slots are in synchronization with the synchronizing signal SYNC.

In the first selector unit 5a-1, the cell generator and input signal inserting unit 9 generates a sequence of empty cells C1, C2, C3, ... in the respective time slots are shown in the lower side in FIG. 5B. In this embodiment, the empty cells C1, C2, C3, ... are generated by the cell generator in the unit 9 but are not generated by the control data generating unit 4a. The empty cells C1, C2, C3, ... are also synchronized with the synchronizing signal SYNC. When the collation unit 8 in the first selector unit 5a-1 detects data (channel) CH1 in the control data designating the selector unit 5a-1, the unit 9 inserts the input signal from the input port 1-1 into the cell of the time slot.

The synchronization signal and the control data are passed through the collation units 8 in all of the selector units 5a-1 to 5a-N. In each of the selector units 5a-2 to 5a-N, when the channel CHi is detected by the collation unit 8, the input signal from the corresponding input port 1-i is written on the cell of the time slot when the channel CHi is detected.

Figure 3:
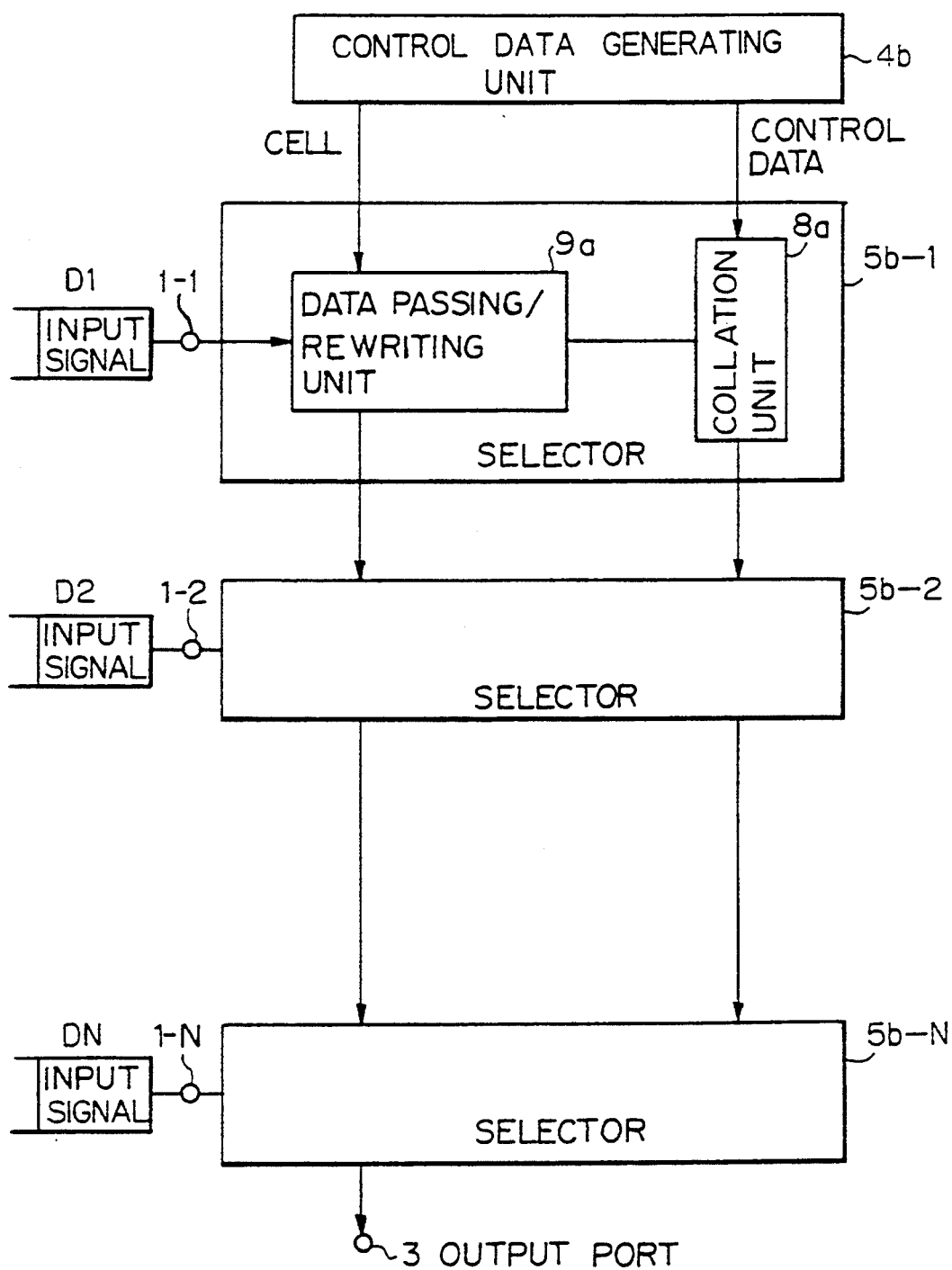
FIG. 3 is a block diagram showing a construction of an input-output signal control apparatus according to another embodiment of the present invention.

FIG. 3 is a block diagram of an input-output signal control apparatus according to another embodiment of the present invention. In the figure, the difference from the embodiment of FIG. 2 are such that a control data generating unit 4b generates the control data as well as cells, a first selector unit 5b-1 does not include the cell generator and the input signal inserting unit but has the same construction as the remaining selector units 5b-2 to 5b-N including a collation unit 8a and a data passing/rewriting unit 9a, and the control data generating unit 4b does not generate the synchronizing signal SYNC. The cells may be empty cells or valid data storing cells. The valid data storing cells may be, for example, supervising cells for supervising the apparatus. In this embodiment, synchronization is carried out by a predetermined signal in the control data in each time slot.

When the above-mentioned control data is input to the selector unit 5b-i and is determined by the collation unit 8b that the selector unit 5b-i is designated, the data passing/rewriting unit 9a writes the input signal from the input port 1-i on the cell of the time slot synchronously transmitted to the selector unit 5b-i. Namely, the data in the cell of the time slot is rewritten by the input signal Di. The cell of the time slot in which the input signal Di has been written is output from the selector unit 5-i to the next stage selector unit 5-(i+1).

When the collation unit 8a determines that the above-mentioned control data taken by the selector unit 5-i does not designate the selector unit 5-i, the data passing/rewriting unit 9a does not write on the cell of the time slot synchronously transmitted to the selector unit 5-i, but passes the data stored in the cell of the time slot through said selector unit 5-i without change.

Figure 4:
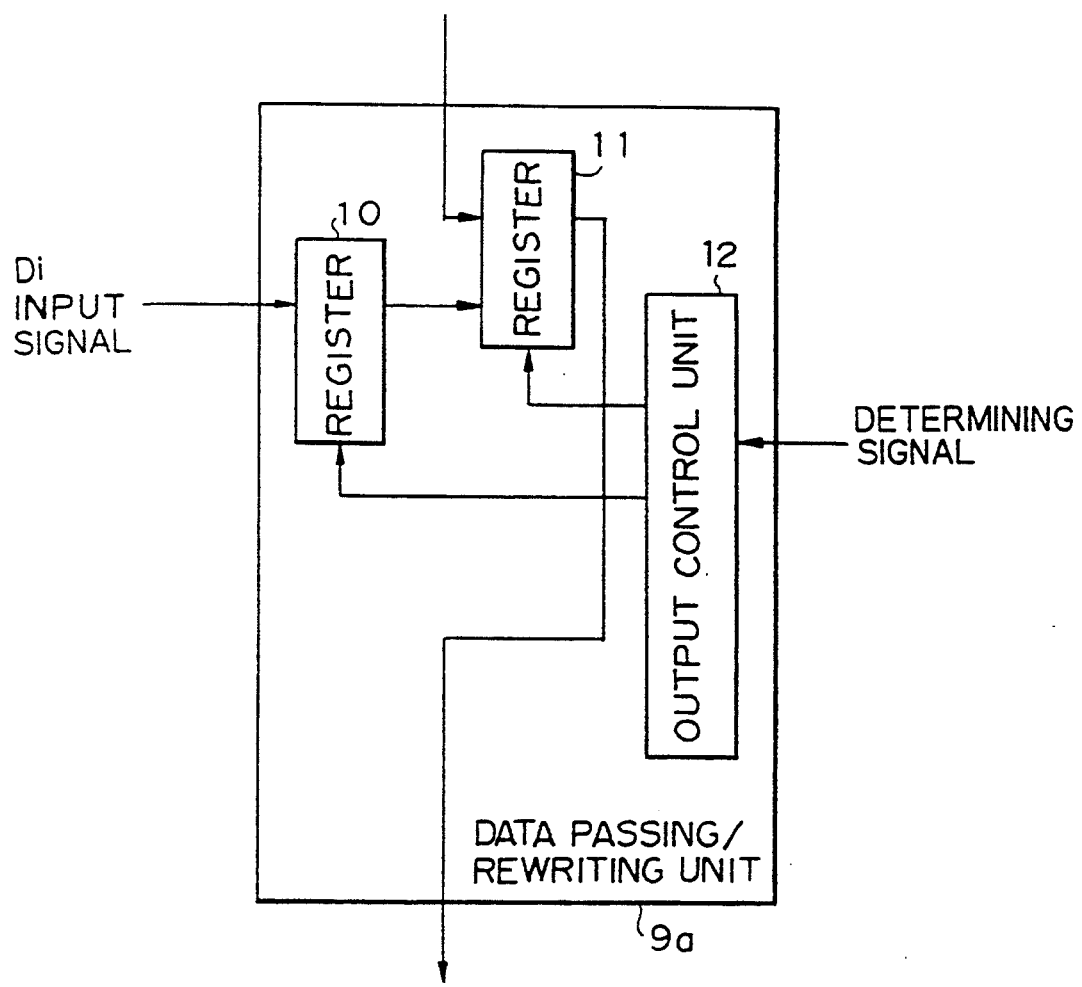
FIG. 4 is a block diagram showing a construction of a data passing/rewriting unit in the apparatus shown in FIG. 3.

FIG. 4 shows a construction of an embodiment of the data passing/rewriting unit 9a in the selector unit 5b-i in FIG. 3.

In FIG. 4, 10 and 11 are registers, and 12 is an output control unit.

In the register 10, the input signal Di from the input port 1-i is set. In the register 11, the input signal Di set in the register 10 or the data stored in a cell of a time slot synchronously sent to the selector unit 5b-i is stored. Namely, in the register 11, either the cell data from the cell control data generating unit 4b, or the input signal from the input port 1, which is to be written over the cell, is stored.

The output control unit 12 controls the output of the register 10 in which the input signal Di is stored and also controls the output of the register 11 in which the data of the time slot of the cell from the control data generating unit 4b is stored, as follows. Namely, when the collation unit 8a determines that the selector unit 5-i in question is being designated, the data of the time slot stored in the register 11 is rewritten by the input signal Di set in the register 10, and then the data of the time slot stored in the register 11, i.e., the input signal Di is output from the selector unit 5-i in question.

When the collation unit 8a determines that the selector unit 5-i in question is not designated, the data of the time slot stored in the register 11 is output from the selector unit 5-i in question without any change.

FIGS. 5A to 5D are time charts explaining the operation of the apparatus shown in FIG. 3.

FIG. 5A shows the synchronizing signal used in the embodiment shown in FIG. 2. In the embodiment shown in FIG. 3, the synchronizing signal SYNC is not generated from the control data generating unit 4b but the synchronization is carried out by using a signal in each time slot of the control data CH1, CH2, ....

FIG. 5B shows control data and cells input to the selector unit 5b-1. As shown in FIG. 5B, the control data generating unit 4b generates control data CH1, CHN, null, CH2, ... and empty cells C1, C2, C3, ... in synchronization with respective time slots. At the selector unit 5b-1, when the control data CH1 is detected, the selector unit 5-1 inserts the input signal D1 from the input port 1-1 into the empty cell C1 of the time slot of the main signal that is input synchronously with the control data CH1. Thus, as shown in FIG. 5C, at the output of the selector unit 5b-1, the main signal, including the input signal D1 and the remaining empty cells C2, C3, ... are output. Note that the time lag between the control data shown in FIG. 5B and the control data shown in FIG. 5C is a delay time between the input and the output of the selector unit 5b-1. In this embodiment, the input signal D1 is inserted into a receiving time slot.

Similarly, in the selector unit 5b-2, as shown in FIG. 5D, the input signal D2 from the input port 1-2 is inserted into the time slot of the empty cell of the main signal that is input synchronously with the control data CH2.

In the remaining selector units 5b-3 to 5b-N, similar operations are carried out. Accordingly, from the output port 3, the main signal indicated in FIG. 5E, which is a sequence of input signals and empty cells, is output in such a way that the respective input signals D1, DN, D2 are inserted, synchronously with the control data in the time slots of the empty cells corresponding to the channels designated by the control data.

In the above description, the input signal from the input port designated by the control data is written on a receiving time slot of an empty cell that is input synchronously with the control data in question. Alternatively, however, by changing the control of the data passing/rewriting unit 9a, the signal data may be written on the time slot of an empty cell that is input synchronously with the next control data, as shown in FIGS. 6A to 6D.

Namely, when the register unit 5b-i in question is determined to be designated by the collation unit 8a, the output control unit 12 immediately writes the input signal Di set in the register 10 onto the data in the empty cell of the next time slot stored in the register 11, and the data is output from the selector unit 5b-i in question.

When the control data CH1 and an empty cell C1 of a time slot synchronously with the control data CH1 are output from the control data generating unit 4b as shown in FIG. 6A, the input signal D1 from the input port 1-1 is inserted, in the selector unit 5b-1, into the time slot of an empty cell of the main signal that is input synchronously with the next control data CHN followed by the control data CH1.

Similarly, the input signal D2 from the input port 1-2 is inserted, in the selector unit 5b-2, into the time slot of an empty cell of the main signal that is input synchronously with the next control data followed by the control data CH2, as shown in FIG. 6C.

Accordingly, from the output port 3, the control signals, i.e., the main signal indicated in FIG. 6D, which includes respective input signals D1, D2, ..., DN from the input ports and are inserted, synchronously with the control data in the time slots of the next empty cells corresponding to the channels designated by the control data, are output.

In this embodiment shown in FIGS. 6A to 6D, it is not necessary to keep the main signal waiting while the control data is judged.

In FIGS. 5B to 5E and 6A to 6D, the control data includes null data in one or more time slots, and the cells corresponding to the null data are not rewritten by the input signals. Therefore, in such cells corresponding to the null data, valid data such as apparatus supervising data may be previously inserted in the control data generating unit 4b.

FIG. 7 is a block diagram of an input-output signal control apparatus according to still another embodiment of the present invention.

In the figure, reference 13 is a control data generating unit for outputting a main signal and a data enable signal. In the main signal generated from the control signal generating unit 13, control data CH1, CHN, CH2, ... and empty cells are inserted in a sequence. The data enable control signal is used to indicate whether or not an input signal from an input port 1-i has been inserted in the empty cell in question.

14 is a flag describing unit for establishing, when an input signal from the input port 1-i is written into a time slot of an empty cell in the data passing/rewriting unit 9, a flag in synchronization with the time slot of the empty cell in question, in the data enable control signal.

15 is a determining unit for determining whether or not the selector unit is designated based on the control data stored in the empty cell of the input time slot and the data enable control synchronous with the time slot of the empty cell in question, and for establishing, when it is determined that the own selector is being designated, a flag in the above-mentioned data enable control signal.

Describing the operation of the determining unit 15 in more detail, when a flag is established in the input data enable control signal to represent a disable state, it means that the input signal from the input port 1-i has already been written so that a signal for passing the data in the cell of the time slot corresponding to the established flag is passed without change even when the control signal designates the selector unit in question.

Note that the control signal designating the selector in question may be written by another selector unit, since the main signal contains both the control signals and the empty cells.

When a flag is not established in the input data enable control signal to represent an enable state, the control data stored in the empty cell of the time slot, in which the flag is not established, is checked and, when the selector unit 5-i belonging to the determining unit 15 in question is designated, the determining unit 15 outputs a signal instructing a rewrite of the control data stored in the empty cell of the time slot in question input to the data passing/rewriting unit 9 by the input signal CHi from the input port 1-i. At the same time, the determining unit 15 outputs a signal to disable the flag describing unit 14 by establishing a data enable control signal flag synchronously with the time slot in question.

FIGS. 8A to 8D are time charts explaining the operation of the apparatus shown in FIG. 7. Referring to FIGS. 8A, the main signal including empty cells EC and cells storing control data CH1, CHN, CH2, ..., and the data enable control signal are output from the control data generating unit 13. In the selector unit 5c-1, when the control data CH1 is detected and when a flag "1" is not established in the time slot corresponding to the control data CH1, the input signal D1 from the input port 1-1 is inserted into the time slot of the cell in which the control data CH1 designating the selector unit 5-1 is stored as shown in FIG. 8B. At the same time, on the data enable control signal line, a flag "1" is established at a position synchronously with the time slot on which the input signal CH1 from the input port 1 in question has been written.

Similarly, in the selector unit 5c-2, when the control data CH2 is detected in the control data and when the above-mentioned flag is not established in the time slot of the input data enable control line corresponding to the control data CH2, the input signal D2 from the input port 1-2 is inserted into the time slot of cell storing the control data CH2, and a flag "1" is established in the corresponding time slot of the data enable control signal as shown in FIG. 8C.

Similar operations are carried out in the remaining selector units 5c-3 to 5c-N.

Accordingly, from the output port 3, the main signal, in which the various input signals from the input ports designated by the control data are stored in the cells in respective time slots, is output as shown in FIG. 8D.

By the embodiment shown in FIG. 7, since the discrimination of whether or not data is written in a time slot is indicated by two states of "1" and "0", the data enable control signal line can be a single line. Also, the control data and the cells can be sent by a single line.

Note that although an example of the data passing/rewriting unit 9a is described in which it is constructed by the registers 10 and 11 and the output control unit 12 as shown in FIG. 4, it may alternatively be constructed by a memory and a memory control unit. In this case, each selector unit does not have the above-mentioned memory and memory control unit, but a single memory and a single memory control unit are provided for all selector units, and the operation is substantially the same as when each selector unit is provided with the data passing/rewriting unit.

As described above, according to the present invention, by selecting respective signal data from the input ports and inserting the data into the time slots in synchronization with a synchronizing signal, the main signal, in which the signal data are inserted in the time slot, have trued up phases.

We claim:

1. An input-output signal control apparatus for receiving input signals through a plurality of input ports respectively and for converting the received input signals into a main signal synchronized with a sequence of time slots, said main signal being output through a main signal line from a single output port, said apparatus comprising:

a control data generating unit for generating control data for designating input signals to be output in synchronization with said sequence of time slots and generating cells in synchronization with said time slots; and a plurality of selector units, connected to said plurality of input ports respectively, and connected in series between said control data generating unit and said output port, for selecting, in accordance with said control data, input signals to be output through said main signal line in synchronization with said time slots so as to obtain said main signal at said output port, a selecting signal for designating one of said selector units can be included in each of said time slots, each of said selector units comprising:

a determining unit for determining, at every time when said selecting signal is received, whether or not one of said selector units including said determining unit is designated by said selecting signal, when said determining unit determines that said one of said selector units is designated by said selecting signal, the input signal from the corresponding input port is output to said main signal line in synchronization with said time slots of said selecting signal, and when said determining unit determines that said one of said selector units is not designated by said selecting signal, the data on the main signal line in the said time slots of said selecting signal is passed through said of said selector units in question without change; and a data passing/rewriting unit, operatively connected to said determining unit, for writing a selected input signal into the cell of said input time slot when said determining unit determines that said one of said selector units is designated by said selecting signal, and for passing the cell of said input time slot without change when said determining unit determines that said one of said selector units is not designated by said selecting signal.

2. An input-output signal control apparatus as claimed in claim 1, wherein each of said selector units detects each of said time slots by a signal in said control data in each of said time slots.

3. An input-output signal control apparatus as claims in claim 1, wherein said control signal generating unit further generates a synchronizing signal synchronized with said control data, said selector units receiving said synchronizing signal and detecting each of said time slots upon receipt of said synchronizing signal.

4. An input-output signal control apparatus as claimed in claim 1, wherein said selected input signals are written into the cells of a receiving time slot.

5. An input-output signal control apparatus as claimed in claim 1, wherein said selected input signals are written into the cells of next receiving time slots.

6. An input-output signal control apparatus as claimed in claim 1, wherein said cells generated by said control data generating unit are empty cells.

7. An input-output signal control apparatus as claimed in claim 1, wherein at least one of said cells generated by said control data generating unit include valid data, and said control data is so formed that said valid data is not rewritten by the input signal.

8. An input-output signal control apparatus as claimed in claim 1, wherein said control data generated from said control data generating unit includes a data enable control signal and a sequence of cells, said data enable control signal having a flag in a time slot when an input signal has already been written in the cell of said time slot, and each of said cells can possibly include, in each of said time slots, a selecting signal for designating one of said selector units;

wherein when said selector signal designates said selector units in question and when a flag is not established in said time slot of the data enable control signal, said selector units in question write an input signal into the cell of said input time slot and establishes a flag in the data enable control signal of said input time slot, and when said selector signal does not designate said selector units in question or when the flag is established in said time slot of the data enable control signal, the corresponding cell is passed through said selector units in question.

9. An input-output signal control apparatus as claimed in claim 8, wherein each of said selector units comprises:

a determining unit for determining, at every time said selecting signal is received, whether or not said selector units, including said determining unit, are designated by said selecting signal and said data enable control signal, and for generating a flag establishing signal when said selector units are determined to be designated;

a data passing/rewriting unit, operatively connected to said determining unit, for writing said selected input signal into the cell of said input time slot when said determining unit determines that said selector units are designated by said selecting signal, and for passing the cell of said input time slot without change when said determining unit determines that said selector units are not designated by said selecting signal; and a flag describing unit, operatively connected to said determining unit and to said control data generating unit, for establishing a flag in said data enable control signal in synchronization of a time slot when said input signal is written in the cell of said time slot in response to said flag establishing signal and a cell is not rewritten by an input signal even when said selecting signal for designating said selector units in question are included in the cell.

* * * * *